United States Patent
Chen et al.

(10) Patent No.: US 8,993,690 B2
(45) Date of Patent: Mar. 31, 2015

(54) SOFT THERMOPLASTIC POLYURETHANE BASED ON THE ESTER OF A TRICARBOXYLIC ACID

(75) Inventors: Bin-Eric Chen, Shanghai (CN); Frank Schaefer, Stemwede (DE); Dirk Kempfert, Stemwede-Dielingen (DE); Christoph Bahr, Lembruch (DE); Guenter Scholz, Lemfoerde (DE); Teruya Ohkuwa, Suita (JP); Martin Vallo, Bramsche (DE); Carsten Guenther, Wagenfeld (DE); Harald Schulz, Vechta (DE); Yasuyuki Suzuki, Kuwana (JP); Tien Kuan Lim, Selangor (MY)

(73) Assignee: BASF SE, Ludwigshafen (DE)

( * ) Notice: Subject to any disclaimer, the term of this patent is extended or adjusted under 35 U.S.C. 154(b) by 156 days.

(21) Appl. No.: 13/266,199

(22) PCT Filed: Apr. 26, 2010

(86) PCT No.: PCT/EP2010/055490
§ 371 (c)(1),
(2), (4) Date: Oct. 25, 2011

(87) PCT Pub. No.: WO2010/125009
PCT Pub. Date: Nov. 4, 2010

(65) Prior Publication Data
US 2012/0041119 A1    Feb. 16, 2012

(30) Foreign Application Priority Data

Apr. 29, 2009 (WO) ............... PCT/CN2009/071551
Sep. 25, 2009 (WO) ............... PCT/CN2009/001077

(51) Int. Cl.
C08L 75/06 (2006.01)
C08K 5/11 (2006.01)
C08G 18/42 (2006.01)
C08G 18/48 (2006.01)
C08G 18/66 (2006.01)
C08G 18/76 (2006.01)
C08J 3/18 (2006.01)
C08K 5/00 (2006.01)

(52) U.S. Cl.
CPC ........ *C08G 18/4238* (2013.01); *C08G 18/4854* (2013.01); *C08G 18/664* (2013.01); *C08G 18/6674* (2013.01); *C08G 18/7657* (2013.01); *C08J 3/18* (2013.01); *C08G 2120/00* (2013.01); *C08J 2375/04* (2013.01); *C08K 5/0016* (2013.01); *C08K 5/005* (2013.01); *C08K 5/11* (2013.01)

USPC .......................................... 525/454; 524/460

(58) Field of Classification Search
USPC .......................................... 525/454; 524/600
See application file for complete search history.

(56) References Cited

U.S. PATENT DOCUMENTS

| | | | | |
|---|---|---|---|---|
| 5,331,044 | A * | 7/1994 | Lausberg et al. | 524/871 |
| 5,908,894 | A * | 6/1999 | Genz et al. | 524/590 |
| 6,538,075 | B1 * | 3/2003 | Krech et al. | 525/458 |
| 6,790,916 | B2 * | 9/2004 | Brauer et al. | 525/457 |
| 8,138,299 | B2 * | 3/2012 | Duwenhorst et al. | 528/83 |
| 2004/0077291 | A1 * | 4/2004 | Arthur et al. | 449/20 |
| 2005/0106200 | A1 | 5/2005 | Corzani et al. | |
| 2006/0160936 | A1 * | 7/2006 | Sullivan | 524/310 |
| 2007/0049685 | A1 * | 3/2007 | Hansel et al. | 524/589 |
| 2007/0072988 | A1 * | 3/2007 | Frappier et al. | 524/567 |
| 2007/0287781 | A1 * | 12/2007 | Grass et al. | 524/308 |
| 2008/0004388 | A1 * | 1/2008 | Malz et al. | 524/378 |
| 2009/0291300 | A1 * | 11/2009 | Etoh et al. | 428/355 AC |
| 2011/0245449 | A1 | 10/2011 | Boudou et al. | |

FOREIGN PATENT DOCUMENTS

| | | |
|---|---|---|
| EP | 0 134 455 | 3/1985 |
| EP | 1 108 735 | 6/2001 |
| EP | 1 277 773 | 1/2003 |
| EP | 1 338 614 | 8/2003 |
| EP | 1 556 433 | 7/2005 |
| JP | 2002-226700 | 8/2002 |
| JP | 2007-510805 | 4/2007 |
| JP | 2007-326859 | 12/2007 |
| WO | 2007 038489 | 4/2007 |
| WO | WO 2007038489 A2 * | 4/2007 |

OTHER PUBLICATIONS

International Search Report Issued Jul. 16, 2010 in PCT/EP10/055490 Filed Apr. 26, 2010.

* cited by examiner

*Primary Examiner* — Mike M Dollinger
(74) *Attorney, Agent, or Firm* — Oblon, McClelland, Maier & Neustadt, L.L.P.

(57) ABSTRACT

The invention refers to a thermoplastic polyurethane produced from at least an organic diisocyanate and a compound which is reactive toward isocyanates, wherein the polyurethane comprises the ester of a tricarboxylic acid with at least one alcohol and wherein all acid groups of the tricarboxylic acid are esterified with an alcohol. The invention further refers to a process for producing the respective polyurethane, products comprising this thermoplastic polyurethane and the use of the ester of a tricarboxylic acid as plasticizer in thermoplastic polyurethanes.

14 Claims, No Drawings

SOFT THERMOPLASTIC POLYURETHANE BASED ON THE ESTER OF A TRICARBOXYLIC ACID

The invention relates to very soft thermoplastic polyurethanes, which have a very high mechanical strength and are readily processable.

Thermoplastic polyurethanes (TPU) have been known for a long time. They are of industrial importance because of the combination of good mechanical properties with the known advantages of inexpensive, thermoplastic processability. The use of different chemical formative components enables a wide variety of mechanical properties to be achieved. An overview of TPU, their properties and uses is given in, for example, Hans-Georg Wussow: "Thermoplastic Elastomers", Ullmann's Encyclopedia of Industrial Chemistry, Electronic Release, $7^{th}$ ed., chap. 2 "thermoplastic Polyurethane Elastomers", Wiley VCH, Weinheim (2004).

Soft thermoplastic polyurethanes (TPU) which at Shore hardnesses of less than 70 A can still be handled as industrial materials and can be processed in conventional processes have hitherto been able to be produced only with a very great technical outlay or require very expensive raw materials.

The fact that plasticizer-free TPU having Shore hardnesses of less than 70 A are virtually absent from the market despite a high demand shows that either the processes are too costly or the mechanical properties of such a material are not sufficient to be able to survive in the market.

As an alternative, attempts are made to obtain TPU having Shore hardnesses of less than 50 A by means of plasticizers. However, no TPU comprising a plasticizer has hitherto led to a soft TPU which achieves a satisfactory mechanical strength. A frequent reason for this is unsatisfactory miscibility of the plasticizer with the TPU. In addition, the plasticizer added in the production process virtually always weakens the molar mass buildup, which likewise leads to the mechanical properties of the TPU produced in this way being unsatisfactory and/or production by a conventional thermoplastic processing method such as injection molding or extrusion is no longer economically feasible.

The plasticizers are frequently phthalates or benzoates for polyester polyurethanes (EP 1 556 433) or phosphates for polyether TPU (EP 1 344 55). The plasticizers used on the market are frequently not entirely unproblematical from a toxicological point of view. Processing, in particular of benzoates, is disadvantageous since benzoates influence the course of the reaction and in this way hinder the molar mass buildup. This problem occurs, in particular, when the plasticizers are added directly during the synthesis of the polyurethane, preferably thermoplastic polyurethane.

Other plasticizers from the group of adipates, hydrogenated phthalates, fatty acids as described in EP 1108735 or even polyolefins are not sufficiently miscible with polyurethane. Plasticizers from the group consisting of phosphates are less suitable for use in polyurethane based on ester polyols because of their acid content, since the acid group can cause cleavage of the ester.

It was then an object of the invention to develop a formulation for thermoplastic polyurethanes (TPU) which makes it possible, using conventional raw materials and conventional production methods, to obtain a soft TPU which, firstly, displays good mechanical properties in the hardness range of less than 70 Shore A and can be molded by injection molding or extrusion in practicable processing cycles to give finished products.

When using a plasticizer, it has to be ensured that this can readily be incorporated into the TPU, should migrate out and/or be given off as vapor to only a slight extent, should not have an adverse effect on the properties of the polyurethane, e.g. processability, thermal stability and UV stability, should not promote degradation of the TPU and should be stable toward liquid media and in particular should also be suitable as material for use in articles which come into contact with foods or human body constituents. At the same time, the mechanical properties of the TPU, e.g. abrasion and the elastomeric properties, should not become worse than when using comparable plasticizers. The TPU itself should have soft properties and form molding compositions which can readily be removed from the mold and display low shrinkage and good low-temperature properties.

This object has surprisingly been able to be achieved by TPU produced from at least an organic diisocyanate (a) and a compound (b) which is reactive toward isocyanates, wherein the TPU comprises the ester (i) of a tricarboxylic acid (g) with at least one alcohol (h) and all acid groups of the tricarboxylic acid (g) are esterified with an alcohol (h).

The invention further provides a TPU produced from at least an organic diisocyanate (a) and compounds (b) which are reactive toward isocyanates, preferably comprising from 50% by weight to 99% by weight of a thermoplastic TPU produced from at least one organic diisocyanate (a) and a compound (b) which is reactive toward isocyanates and has a molecular weight of from 0.5 kg/mol to 8 kg/mol, preferably a polyol, more preferably a polymer diol, and at least one chain extender (c) which has a molecular weight of from 0.06 kg/mol to 0.5 kg/mol and comprises the ester of a tricarboxylic acid (g) with at least one alcohol (h), where all acid groups of the tricarboxylic acid are esterified with an alcohol (h).

The invention further provides production processes for the TPU of the invention, products which can be produced therefrom and also provides for the use of tricarboxylic esters as plasticizers in TPU.

Thermoplastic polyurethanes comprising the ester of a tricarboxylic acid, which preferably acts as plasticizer, have the advantage that the plastics are also suitable for applications where they come into contact with foods since they are significantly less toxicologically problematical than previous plasticizers. Here, the ester of a tricarboxylic acid can be incorporated readily, migrates out to only a small extent, is given off as vapor only to a small extent and at the same time improves the properties of the TPU such as processability, thermal stability and UV stability and does not promote degradation of the plastic.

A further advantage of the TPU of the invention is the possibility of use in the food sector and in direct contact with foods or in direct contact with the surface of the body or other body parts. In addition, the TPU has a high heat resistance and thus has a broad processing window in a thermoplastic molding process.

Even if not every combination of the embodiments of a feature with every embodiment of a further feature is presented in the following, the following description implicitly comprises all possible combinations of the indicated embodiments of the various features. Thus, for example, the combination of a preferred feature with a particularly preferred feature or of a feature which is not further characterized with a particularly preferred feature, etc., is implicitly comprised even when this combination is not expressly mentioned.

In a preferred embodiment, the present invention provides TPU comprising:
A) 50-99% by weight of a thermoplastic polyurethane produced from 1) at least one organic diisocyanate (a),
2) at least one compound (b) which is reactive toward isocyanates and has a molecular weight of from 0.5 kg/mol to 8 kg/mol,
3) at least one chain extender (c) having a molecular weight of from 0.06 kg/mol to 0.5 kg/mol,
4) optionally catalysts (b) and/or customary auxiliaries (e) and/or additives (f), B) 1-50% by weight of an ester (i) of a tricarboxylic acid (g) with at least one alcohol (h), where all acid groups of the tricarboxylic acid (g) are esterified with an alcohol (h) so as to form a triester. Here, it is possible for either different alcohols (h) or the same alcohol (h) to form the trimester, preferred is the same alcohol (h).

The components organic diisocyanate (a), compound (b) which is reactive toward isocyanates and chain extender (c) are also referred to as formative components (j).

The ester (i) of the tricarboxylic acid (g) with at least one alcohol (h), where all acid groups of the tricarboxylic acid (g) are esterified with an alcohol (h), is comprised in the thermoplastic polyurethane, in an amount of from 1% by weight to 50% by weight, preferably from 5% by weight to 40% by weight, in particular from 15% by weight to 35% by weight, in each case based on the total weight of the formative components (j).

In a preferred embodiment, the tricarboxylic acid (g) has an aliphatic structure which is branched and comprises from 4 to 30 carbon atoms, more preferably from 4 to 20 carbon atoms, particularly preferably from 5 to 10 carbon atoms and very particularly preferably 6 carbon atoms, counting the carbon atoms of the three carboxyl groups. The carbon atoms are bound directly to one another via single or double bonds in the branched aliphatic structure. The aliphatic structure preferably has only single bonds between the carbon atoms.

In a further preferred embodiment, the tricarboxylic acid (g) comprises at least one hydroxyl group. The at least one hydroxyl group is directly bound to a carbon atom of the above-described aliphatic structure of the tricarboxylic acid (g) in such a way that the at least one hydroxyl group is bound in addition to the three acid groups on the aliphatic structure. Particular preference is given to one hydroxyl group being present on the aliphatic structure of the tricarboxylic acid (g). A particularly preferred tricarboxylic acid (g) is citric acid. The alcohols (h) which form an ester (i) with all three acid groups of the tricarboxylic acid (g) can have aromatic and/or aliphatic structures. Further preference is given to alcohols which comprise from 1 to 30 carbon atoms, more preferably from 1 to 20 carbon atoms, more preferably from 1 to 10 carbon atoms, even more preferably from 1 to 8 carbon atoms and particularly preferably from 1 to 6 carbon atoms.

Preference is given to using alcohols (h) having an aliphatic structure, more preferably alcohols (h) having linear aliphatic structures, with particular preference being given to aliphatic structures which do not have any double bonds.

In a further preferred embodiment, the alcohols (h) comprise an even number of carbon atoms, i.e. 2, 4, 6, 8, 10, 12, 14, 16 etc., carbon atoms.

In a very particularly preferred embodiment, the alcohol (h) is ethanol. In a second very particularly preferred embodiment, the alcohol (h) is a butanol, preferably n-butanol. Further preference is given to all three acid groups of the tricarboxylic acid (g) being esterified with the same alcohol (h). In a very particularly preferred embodiment, the ester (i) is tributyl 2-acetoxy-1,2,3-propanetricarboxylate.

In further preferred embodiments, the at least one hydroxyl group of the tricarboxylic acid (g) is additionally esterified with a carboxylic acid. The carboxylic acid is selected from among aromatic or aliphatic carboxylic acids having from 1 to 40 carbon atoms, more preferably from 1 to 30 carbon atoms, particularly preferably from 2 to 22 carbon atoms, and in particularly preferred embodiments the number of carbon atoms is a multiple of 2, most preferred is acetic acid.

In further preferred embodiments, the at least one hydroxyl group of the tricarboxylic acid (g) is etherified. The ether radical commencing after the oxygen of the hydroxyl group of the tricarboxylic acid comprises from 1 to 40 carbon atoms, more preferably from 1 to 30 carbon atoms, particularly preferably from 2 to 22 carbon atoms, and in particularly preferred embodiments the number of carbon atoms is a multiple of 2. In further preferred embodiments, the ether is polyethylene glycol or polypropylene glycol, particularly preferably polyethylene glycol.

In alternative embodiments, the tricarboxylic acid (g) comprises at least one amine group. In preferred embodiments, a carboxylic acid forms an acid amide with this amine group. This carboxylic acid is selected from among aromatic or aliphatic carboxylic acids having from 1 to 40 carbon atoms, more preferably from 1 to 30 carbon atoms, particularly preferably from 1 to 22 carbon atoms, and in particularly preferred embodiments the number of carbon atoms in the carboxylic acid is a multiple of 2.

In further preferred embodiments, the at least one amine group of the tricarboxylic acid (g) forms a secondary amine with at least one radical R' or a tertiary amine with a second radical R". The radicals R' and R" comprise, independently of one another, from 1 to 40 carbon atoms, more preferably from 1 to 30 carbon atoms, particularly preferably from 2 to 22 carbon atoms, and in particularly preferred embodiments the number of carbon atoms is a multiple of 2. In further preferred embodiments, the radical is a polyethylene glycol or polypropylene glycol, particularly preferably polyethylene glycol.

Processes for producing TPU, are generally known. For example, the TPU can be produced by reaction of (a) isocyanates with (b) compounds which are reactive toward isocyanates and have a number average molecular weight of from 0.5 kg/mol to 6 kg/mol and (c) chain extenders having a number average molecular weight of from 0.05 kg/mol to 0.5 kg/mol, optionally in the presence of (d) catalysts and/or (e) customary auxiliaries and/or (f) additives. The ester (i) which also functions as plasticizer can be added either to the compounds (b) which are reactive toward isocyanates either before or during production of the TPU, or to the finished TPU, for example to the molten or softened TPU.

A particular advantage in the use in thermoplastic polyurethane is that the TPU can be processed thermoplastically without the effect of the plasticizer being lost. The components (a), (b), (c) and optionally (d) and/or (e) and/or (f) customarily used in the production of TPU are described by way of example in the following:

Organic diisocyanates (a) used are customary aliphatic, cycloaliphatic, araliphatic and/or aromatic isocyanates, for example trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate, preferably diphenylmethane 2,2'-, 2,4'- and/or 4,4'-diisocyanate (MDI), dicyclohexylmethane 4,4'-, 2,4'- and/or 2,2'-diisocyanate and/or hexamethylene diisocyanate (HDI).

In a particularly preferred embodiment, the organic diisocyanate is an isocyanate comprising at least 90% by weight, more preferably at least 95% by weight, particularly preferably at least 99% by weight, of diphenylmethane diisocyanates (MDI).

As compounds (b) which are reactive toward isocyanates, it is possible to use the generally known compounds which are reactive toward isocyanates, for example polyesterols, polyetherols and/or polycarbonate diols, which are usually also summarized under the term "polyols (b1)", having number average molecular weights in the range from 0.5 kg/mol to 8 kg/mol, preferably from 0.6 kg/mol to 6 kg/mol, in particular from 0.8 kg/mol to 3 kg/mol. The average functionality of the polyol (b1) toward the diisocyanate (a) is in the range from 1.7 to 2.3, more preferably from 1.8 to 2.2, more preferably from 1.9 to 2.1, more preferably from 1.95 to 2.05, even more preferably from 1.98 to 2.02 and particularly preferably from 1.99 to 2.01, and is very particularly preferably 2.

The polyols (b1) are particularly preferably linear hydroxyl-terminated polyols (b1). Due to the method of production, these polyols (b1) often comprise small amounts of nonlinear compounds. They are therefore frequently also referred to as "essentially linear polyols". Preference is given to polyester diols, polyether diols, polycarbonate diols or mixtures thereof.

Polyols (b1) used are preferably polyether polyols, for example ones based on generally known starter substances and customary alkylene oxides, for example ethylene oxide, epichlorohydrin, propylene oxide and/or 2,3-butylene oxide, preferably polyetherols based on 1,2-propylene oxide and ethylene oxide. Very particular preference is given to polyoxytetramethylene glycols. The alkylene oxides can be used individually, alternately in succession or as mixtures.

Possible starter molecules are, for example: water, amino alcohols such as N-alkyldiethanolamines, for example N-methyldiethanolamine, and diols, ethylene glycol, 1,3-propylene glycol, 1,4-butanediol and 1,6-hexanediol. If appropriate, it is also possible to use mixtures of starter molecules. Further suitable polyetherols are the hydroxyl-comprising polymerization products of tetrahydrofuran.

The polyol (b1) is particularly preferably a polymer of adipic acid, butanediol and/or ethylene glycol. In an alternative, particularly preferred embodiment, the polyol is a polymer of adipic acid, butanediol and hexanediol, with the number average molecular weight of this particularly preferred embodiment of the polyol (b1) being in the range from 0.8 kg/mol to 2.5 kg/mol.

If the polyol (b1) is a polymer based on butanediol and adipic acid, the number average molecular weight is in the range from 0.8 kg/mol to 2.5 kg/mol, more preferably from 0.8 kg/mol to 2 kg/mol.

If the polyol (b1) is based on ethylene glycol and adipic acid, the preferred number average molecular weight of the polyol (b1) is in the range from 1 kg/mol to 2.5 kg/mol, more preferably from 1.5 kg/mol to 2.5 kg/mol, particularly preferably from 1.8 to 2.3 kg/mol.

If the polyol (b1) is based on ethylene glycol, butanediol and adipic acid, the number average molecular weight is preferably in the range from 1 kg/mol to 2.5 kg/mol. The molar ratio of ethylene glycol to butanediol in the polyol (b1) is preferably in the range from 1:4 to 4:1, more preferably from 3:1 to 1:3, even more preferably from 1:2 to 2:1 and particularly preferably 1:1.

If the polyol (b1) is based on adipic acid, butanediol and hexanediol, it preferably has a number average molecular weight in the range from 1 kg/mol to 2.5 kg/mol, and the molar ratio of butanediol to hexanediol in this polyol (b1) is more preferably in the range from 1:4 to 4:1, preferably from 3:1 to 1:3, more preferably from 1:2 to 2:1 and particularly preferably 1:1.

Furthermore, it is also possible to use polyetherols having a low level of unsaturation as polyetherols. For the purposes of the present invention, polyols having a low level of unsaturation are, in particular, polyether alcohols having a content of unsaturated compounds of less than 0.02 meq/g, preferably less than 0.01 meq/g. Such polyether alcohols are usually prepared by addition of alkylene oxides, in particular ethylene oxide, propylene oxide and mixtures thereof, onto the above-described diols or triols in the presence of high-activity catalysts.

Such high-activity catalysts are, for example, potassium or cesium hydroxide and multimetal cyanide catalysts, also known as DMC catalysts. A frequently used DMC catalyst is zinc hexacyanocobaltate. The DMC catalyst can be left in the polyether alcohol after the reaction, but is usually removed, for example by sedimentation or filtration.

Instead of a polyol (b1), it is also possible to use mixtures of various polyols, which are likewise covered by the expression polyol (b1). The thermoplastic polyurethane of the invention is particularly preferably based on polytetrahydrofuran having a molecular weight in the range from 0.6 kg/mol to 2 kg/mol, preferably from 0.8 kg/mol to 1.4 kg/mol, particularly preferably from 0.95 kg/mol to 1.05 kg/mol, as polyol (b1).

As chain extenders (c), it is possible to use generally known aliphatic, araliphatic, aromatic and/or cycloaliphatic compounds having a molecular weight of from 0.06 kg/mol to 0.5 kg/mol, preferably bifunctional compounds, for example diamines and/or alkane diols having from 2 to 10 carbon atoms in the alkylene radical, in particular 1,4-butanediol, 1,6-hexanediol and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably corresponding oliogopropylene glycols and/or polypropylene glycols, with it also being possible to use mixtures of chain extenders. Preference is given to using 1,2-ethanediol (also known as 1,2-ethylene diol) as chain extender.

1,2-ethanediol is widely known as a possible chain extender for TPU. However, this diol is not utilized because the hard phase formed therefrom with diphenylmethane diisocyanate (MDI) or other isocyanates has only a low thermal stability and is therefore suitable to only a very limited degree for conventional thermoplastic processing. However, the very small proportion of hard phase for soft materials having a hardness of less than Shore 70 A, preferably less than Shore 60 A, more preferably less than Shore 50 A and particularly preferably less than Shore 40 A, could surprisingly be utilized to obtain materials having improved mechanical properties. These mechanical properties are supplemented by using polyols (b1), preferably ones based on adipic acid, in particular those described below. When, in addition, an ester (i) of a tricarboxylic acid (g) is used, preferably as plasticizer, it is possible in this way to produce materials which can be processed industrially in a very simple fashion, preferably in a "one-shot" process, and which achieve the abovementioned Shore hardnesses.

In a preferred embodiment, 1,2-ethylene diol is used in an amount of from 2% by weight to 5% by weight, based on the total weight of the formative components (j) comprising the organic diisocyanate (a), compound (b) which is reactive toward isocyanate and chain extender (c). More preferably, 1,2-ethylene diol is used in this way in an amount of from 2.1% by weight to 4% by weight, even more preferably from 2.5% by weight to 3.5% by weight and particularly preferably from 2.5% by weight to 3% by weight.

Suitable catalysts (d) which, in particular, accelerate the reaction between the NCO groups of the organic diisocyanates (a) and the hydroxyl groups of the formative component constituents (b) and (c) are the tertiary amines which are known and customary in the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also, in particular, organic metal compounds such as titanic esters, iron compounds such as iron (III) acetylacetonate, tin compounds, e.g. tin diacetate, tin dioctoate, tin dilaurate or the dialkyl tin salts of aliphatic carboxylic acids, e.g. dibutyltin diacetate, dibutyltin dilaurate or the like. The catalysts are usually used in amounts of from 0.0001 to 0.1 parts by weight per 100 parts by weight of polyhydroxyl compound (9b). Preference is given to using tin catalysts, in particular tin dioctoate.

Apart from catalysts (d), customary auxiliaries (e) and/or additives (f) can be added in addition to the ester (i) of a tricarboxylic acid (g), preferably used as plasticizer, to the formative components (a) to (c). As auxiliaries (f), mention may be made by way of example of surface-active substances, flame retardants, nucleated agents, oxidation stabilizers, lubricants and mold release agents, dyes and pigments, stabilizers, e.g. against hydrolysis, light, heat or discoloration, and as additives (f), mention may be made by way of example of inorganic and/or organic fillers and reinforcing materials. As hydrolysis inhibitors, preference is given to using oligomeric and/or polymeric aliphatic or aromatic carbodiimides. To stabilize the TPU, of the invention against aging, stabilizers are preferably added to the TPU. For the purposes of the present invention, stabilizers are additives which protect a plastic or a plastic mixture against damaging environmental influences. Examples are primary and secondary antioxidants, "hindered amine light stabilizers", UV absorbers, hydrolysis inhibitors, quenchers and flame retardants. Examples of commercial stabilizers are given in Plastics Additive Handbook, 5th Edition, H. Zweifel, ed., Hanser Publishers, Munich, 2001 ([1]), page 98-page 136.

If the TPU, of the invention is exposed to thermooxidative damage during use, antioxidants can be added. Preference is given to using phenolic antioxidants. Examples of phenolic antioxidants are given in Plastics Additive Handbook, 5th edition, H. Zweifel, ed, Hanser Publishers, Munich, 2001, pages 98-107 and page 116-page 121.

Preference is given to phenolic antioxidants whose molecular weight is greater than 0.7 kg/mol. An example of a phenolic antioxidant which is preferably used is pentaerythrityl tetrakis(3-(3,5-bis(1,1-dimethylethyl)-4-hydroxyphenyl)propionate) (Irganox® 1010). The phenolic antioxidants are generally used in concentrations of from 0.1% by weight to 5% by weight, preferably from 0.1% by weight to 2% by weight, in particular from 0.5% by weight to 1.5% by weight.

The TPU which are exposed to UV light are preferably additionally stabilized with a UV absorber. UV absorbers are generally known as are molecules which absorb high-energy UV light and dissipate the energy. Customary UV absorbers which are employed in industry belong, for example, to the group of cinnamic esters, diphenylcyan acrylates, formamidines, benzylidene malonates, diarylbutadienes, triazines and benzotriazoles. Examples of commercial UV absorbers may be found in Plastics Additive Handbook, 5th edition, H. Zweifel, ed, Hanser Publishers, Munich, 2001, pages 116-122.

In a preferred embodiment, the UV absorbers have a number average molecular weight of greater than 0.3 kg/mol, in particular greater than 0.39 kg/mol. Furthermore, the UV absorbers which are preferably used should have a molecular weight of not more than 5 kg/mol, particularly preferably not more than 2 kg/mol.

Particularly useful UV absorbers are the group of benzotriazoles. Examples of particularly suitable benzotriazoles are Tinuvin® 213, Tinuvin® 328, Tinuvin® 571 and Tinuvin® 384 and also Eversorb®82. The UV absorbers are usually added in amounts of from 0.01 to 5% by weight, based on the total mass of the TPU, preferably 0.1-2.0% by weight, in particular 0.2-0.5% by weight.

An above-described UV stabilization based on an antioxidant and a UV absorber is often still not sufficient to ensure good stability of the TPU of the invention against the damaging influence of UV rays. In this case, a hindered amine light stabilizer (HALS) can be added in addition to the antioxidant and the UV absorber to the TPU of the invention. The activity of the HALS compounds is based on their ability to form nitroxyl radicals which intervene in the mechanism of the oxidation of polymers. HALSs are highly efficient UV stabilizers for most polymers.

HALS compounds are generally known and are commercially available. Examples of commercially available HALSs may be found in Plastics Additive Handbook, 5th edition, H. Zweifel, Hanser Publishers, Munich, 2001, pages 123-136. As "hindered amine light stabilizers", preference is given to "hindered amine light stabilizers" having a number average molecular weight of greater than 0.5 kg/mol. Furthermore, the molecular weight of the preferred HALS compounds should be not more than 10 kg/mol, particularly preferably not more than 5 kg/mol.

Particularly preferred "hindered amine light stabilizers" are bis(1,2,2,6,6-pentamethylpiperidyl) sebacate (Tinuvin® 765, Ciba Spezialitätenchemie AG) and the condensation product of 1-hydroxyethyl-2,2,6,6-tetramethyl-4-hydroxypiperidine and succinic acid (Tinuvin® 622). Very particular preference is given to the condensation product of 1-hydroxyethyl-2,2,6,6-tetramethyl-4-hydroxypiperidine and succinic acid (Tinuvin® 622), when the titanium content of the product is <150 ppm, preferably <50 ppm, in particular <10 ppm. HALS compounds are preferably used in a concentration of from 0.01 to 5% by weight, particularly preferably from 0.1 to 1% by weight, in particular from 0.15 to 0.3% by weight.

A particularly preferred UV stabilization comprises a mixture of a phenolic stabilizer, a benzotriazole and an HALS compound in the above-described preferred amounts.

Further details regarding the abovementioned auxiliaries and additives may be found in the specialist literature, e.g. in Plastics Additive Handbook, 5th edition, H. Zweifel, ed, Hanser Publishers, Munich, 2001.

All molecular weights specified in this text have the unit [kg/mol] and relate, unless indicated otherwise, to the number average molecular weight (Mn).

To adjust the hardness of the TPU, the formative components compound (b) which is reactive toward isocyanates and chain extenders (c) can be varied within a relatively wide range of molar ratios. Molar ratios of component (b) to the total of chain extenders (c) to be used of from 10:1 to 1:10, in particular from 1:1 to 1:4, have been found to be useful, with the hardness of the TPU increasing with increasing content of (c). The reaction can be carried out at customary indexes, preferably at an index of from 60 to 120, particularly preferably at an index of from 80 to 110. The index is defined by the ratio of the total isocyanate groups of the component (a) used in the reaction to the groups which are reactive toward isocyanates, i.e. the active hydrogens, of components (b) and (c). At an index of 100, there is one active hydrogen atom, i.e. one function which is reactive toward isocyanates, of components (b) and (c) per isocyanate group of component (a). At indexes above 100, more isocyanate groups than OH groups are present.

The TPU, can be produced by known processes, either continuously, for example by means of reaction extruders or the belt process by the one-shot process or the prepolymer process, or batchwise by the prepolymer process. In these processes, the components (a), (b), (c) and, if used, (d) and/or (e) to be reacted can be mixed with one another either successively or simultaneously, with the reaction commencing immediately. In the extruder process, the formative components (a), (b) and (c) and, if used, (d) and/or (e) are introduced individually or as a mixture into the extruder, reacted at, for example, temperatures of from 100° C. to 280° C., preferably from 140° C. to 250° C., and the TPU obtained is extruded, cooled and pelletized. The TPU of the invention can also particularly preferably be produced in the "one-shot" process in which all constituents of the TPU are mixed in a mixing chamber and subsequently react to form the desired TPU.

More preferably, the TPU, produced in the one-shot process is placed on a belt unit in order to be able to react to completion and is subsequently preferably processed to form pellets, preferably by means of an extruder which is connected directly to the belt unit and melts the TPU and extrudes it to form a strand. To produce pellets, this strand is mechanically broken up, e.g. to form pellets. In a likewise preferred embodiment, the strand is directly chopped, preferably under water, as exiting melt at the die plate of the extruder.

Furthermore, the reaction mixture is preferably reacted in the "one-shot" process in a twin-screw extruder to synthesize a TPU and is subsequently pelletized as described above.

The production of a TPU according to the invention is particularly preferably carried out using the following components in a "one-shot" process, A) 50-99% by weight of a thermoplastic polyurethane produced from:
  1) at least one organic diisocyanate (a),
  2) at least one compound (b) which is reactive toward isocyanates and has a molecular weight of from 0.5 kg/mol to 8 kg/mol,
  3) chain extenders (c) having molecular weights of from 0.06 kg/mol to 0.5 kg/mol,
  4) optionally catalysts (d) and/or customary auxiliaries (e) and/or additives (f),
B) 1-50% by weight of the ester (i) of a tricarboxylic acid (g) with at least one alcohol (h), where all acid groups of the tricarboxylic acid are esterified with an alcohol (h).

In the products produced in this way, the advantages indicated at the outset for the TPU of the invention are particularly strongly pronounced.

The TPU comprising the tricarboxylic acid (g) ester (i) preferably has a Shore hardness measured in accordance with DIN 53505 of less than 80 Shore A, more preferably less than 70 Shore A, more preferably less than 60 Shore A, even more preferably less than 50 Shore A and particularly preferably less than 40 Shore A. In a further preferred embodiment, the tensile strength of the TPU, measured in accordance with DIN 53504, is greater than 5 MPa, preferably greater than 8 MPa, particularly preferably greater than 10 MPa. In other preferred embodiments, the TPU of the invention have an abrasion resistance measured in accordance with DIN 53516 of less than 200 $mm^3$, preferably less than 150 $mm^3$, particularly preferably less than 100 $mm^3$.

The processing of the TPU, of the invention comprising the ester (i) of a tricarboxylic acid (g) is carried out by customary processes, e.g. injection molding, calendering, powder sintering or extrusion. The TPU of the invention are usually present as pellets or in powder form and are processed by the processes mentioned to give products such as films, fibers and moldings, coatings, damping elements, seals, bellows, fibers, flooring for buildings and transport, cables, cable plugs, cable sheathing, laminates, profiles, belts, rollers, hoses, towing cables, shoe soles, solar modules, plug connections, trim in automobiles or wiper blades, with preference being given to automobile parts, fibers, films, cables, hoses or shoes. Furthermore, the thermoplastic polyurethane, of the invention is used as modifier for thermoplastic materials.

The invention further provides for the use of an ester (i) of a tricarboxylic acid (g) with at least one alcohol (h), where all acid groups of the ester (i) are esterified with an alcohol (h), as plasticizer in thermoplastic polyurethane, more preferably for producing thermoplastic polyurethane having a hardness measured in accordance with DIN 53505 of less than 80 Shore A, preferably less than 70 Shore A, more preferably less than 60 Shore A, more preferably less than 50 Shore A and particularly preferably less than 40 Shore A.

In a further preferred embodiment, a chemical and/or physical blowing agent or a gas is added to the thermoplastic polyurethane, of the invention. Foamed products are produced in this way; these can be, in addition to the abovementioned articles, in particular, shoes, handles and damping elements.

EXAMPLES

The mechanical properties of the polyurethanes are demonstrated in the following examples. All materials or mixtures according to the invention were produced in a one-shot process on a reaction extruder.

Example 1

600 g of diphenylmethane 4,4'-diisocyanate, 169.25 g of 1,4-butanediol and 1000 g of polymer diol having a number average molar mass of 2 kg/mol derived from adipic acid and 1,2-ethanediol and 1,4-butanediol, the latter in a mass ratio of 1:1, are processed in a reaction extruder to synthesize TPU. Furthermore, 8 g of a hydrolysis stabilizer (oligomeric carbodiimide derived from TMDXI), 5.36 g of an antioxidant (hindered phenol derived from tetramethylxylene and polyethylene glycol) and 3.58 g of lubricant (partially hydrolyzed montanic ester) are added thereto. The TPU pellets produced in this way are molded by injection molding to give test bodies and S2 test bars (in accordance with DIN 53504) stamped out of these were subjected to mechanical tests. The maximum temperature of the melt in the production of the test bodies is 210° C.

Example 2

308.12 g (15% by weight) of tributyl 2-acetoxy-1,2,3-propanetricarboxylate were added to the formulation from example 1.

Example 3

558.18 g (25% by weight) of tributyl 2-acetoxy-1,2,3-propanetricarboxylate were added to the formulation from example 1.

Example 4

600 g of 4,4'-MDI, 169.25 g of 1,4-butanediol and 1000 g of a polymer diol having a number average molar mass of 2 kg/mol derived from adipic acid, 1,4-butanediol and 1,6-hexanediol, the latter in a mass ratio of 1:1, are processed in a reaction extruder to synthesize TPU. Furthermore, 8 g of a hydrolysis stabilizer (oligomeric carbodiimide derived from TMDXI=tetramethylxylyl diisocyanate), 5.36 g of an antioxidant (hindered phenol derived from tetramethylxylene and polyethylene glycol) and 3.58 g of lubricant (partially hydrolyzed montanic ester) are added. The TPU pellets produced in this way are molded by injection molding to give test bodies and S2 test bars (in accordance with DIN 53504) stamped out of these are subjected to mechanical tests. The maximum temperature of the melt in the production of the test bodies is 210° C.

Example 5

308.12 g (15% by weight) of tributyl 2-acetoxy-1,2,3-propanetricarboxylate were added to the formulation from example 4.

Example 6

558.18 g (25% by weight) of tributyl 2-acetoxy-1,2,3-propanetricarboxylate were added to the formulation from example 4.

Example 7

700 g of diphenylmethane 4,4'-diisocyanate, 161.97 g of 1,4-butanediol and 1000 g of polytetrahydrofuran having a number average molar mass of 1 kg/mol are processed in a reaction extruder to synthesize TPU. Furthermore, 18.85 g of an antioxidant (hindered phenol derived from tetramethylxylene and polyethylene glycol) and 3.77 g of lubricant (partially hydrolyzed montanic ester) are added. The TPU pellets produced in this way are molded by injection molding to give test bodies and S2 test bars (in accordance with DIN 53504) stamped out of these are subjected to mechanical tests. The maximum temperature of the melt in the production of the test bodies is 210° C.

Example 8

325.09 g (15% by weight) of tributyl 2-acetoxy-1,2,3-propanetricarboxylate were added to the formation from example 7.

Example 9

588.93 g (25% by weight) of tributyl 2-acetoxy-1,2,3-propanetricarboxylate were added to the formation from example 7.

Example 10 (Comparative Example)

325.09 g (15% by weight) of a plasticizer from the group of hydrogenated phthalates (diisononyl cyclohexanedicarboxylate) were added to the formulation from example 7.

Example 11 (Comparative Example)

588.93 g (25% by weight) of a plasticizer from the group of phosphates, viz. diphenyl cresyl phosphate, were added to the formulation from example 7.

Example 12

The mechanical tests are carried out in accordance with DIN 53505 (Shore), 53504 (tensile strength, elongation at break) and DIN 53516 (abrasion). All S2 test bars (in accordance with DIN 53504) of the above examples were stored at 100° C. for 15 hours after production in the interests of better comparability.

TABLE 1

| Example | Shore hardness | Tensile strength/ MPa | Elongation at break/% | Abrasion/ mm$^3$ |
| --- | --- | --- | --- | --- |
| 1 | 91 A | 49 | 490 | 32 |
| 2 | 82 A | 42 | 710 | 40 |
| 3 | 78 A | 35 | 750 | 41 |
| 4 | 91 A | 61 | 520 | 22 |
| 5 | 81 A | 46 | 680 | 26 |
| 6 | 78 A | 38 | 720 | 28 |
| 7 | 90 A | 52 | 460 | 21 |
| 8 | 80 A | 49 | 650 | 23 |
| 9 | 77 A | 45 | 680 | 27 |
| 10(C) | 85 A | 49 | 540 | 24 |
| 11(C) | 80 A | 42 | 640 | 31 |

It can be seen from the table that the plasticizer according to the invention has an effectiveness in the thermoplastic polyurethane which is at least comparable with a commercial plasticizer, as can be seen here by direct comparison of Example 9 and Example 10.

The plasticizer according to the invention can also be used for the production of TPU having low Shore hardnesses. In the following examples, the formulation from Example 1 is shown as a softer variant by way of example.

Example 13

350 g of diphenylmethane 4,4'-diisocyanate (MDI), 76.92 g of 1,4-butanediol and 1000 g of a polymer diol having an average molar mass of 2 kg/mol derived from adipic acid, 1,2-ethanediol and 1,4-butanediol, the latter in a mass ratio of 1:1, are processed in a reaction extruder to synthesize TPU. Furthermore, 8 g of a hydrolysis stabilizer (oligomeric carbodiimide derived from TMDXI), 3.21 g of an antioxidant (hindered phenol derived from tetramethylxylene and polyethylene glycol), 3.21 g of lubricant (partially hydrolyzed montanic ester) and 160.2 g of the plasticizer (=10% by weight) tributyl 2-acetoxy-1,2,3-propanetricarboxylate are added. The TPU pellets are molded by injection molding to give test bodies and S2 test bars (in accordance with DIN 53504) stamped out of these are subjected to mechanical tests. The maximum temperature of the melt in the production of the test bodies is 210° C.

Example 14 (Comparative Example)

The procedure of Example 13 is repeated using a commercial dipropylene glycol dibenzoate as plasticizer (160.2 g=10% by weight).

Example 15

The procedure of Example 13 is repeated with 248.63 g (15% by weight) of the plasticizer being added.

Example 16

The procedure of Example 13 is repeated with 345.92 g (20% by weight) of the plasticizer being added.

Example 17 (Comparative Example)

The procedure of Example 13 is repeated using a commercial dipropylene glycol dibenzoate as plasticizer and adding 345.92 g (20% by weight) of this.

Example 18

360 g of 4,4'-MDI, 91.2 g of 1,4-butanediol and 1000 g of a polymer diol having a number average molar mass of 2.4 kg/mol derived from adipic acid and 1,4-butanediol are processed in a reaction extruder to synthesize TPU. Furthermore, 8 g of a hydrolysis stabilizer (oligomeric carbodiimide derived from TMDXI), 3.21 g of an antioxidant (hindered phenol derived from tetramethylxylene and polyethylene glycol), 3.21 g of lubricant (partially hydrolyzed montanic ester) and 252.8 g of a plasticizer (=15% by weight) tributyl 2-acetoxy-1,2,3-propanetricarboxylate were added.

Example 19 (Comparative Example)

The procedure of Example 13 is repeated using a commercial dipropylene glycol dibenzoate as plasticizer and adding 351.75 g (20% by weight) of this.

Example 20

The mechanical tests are carried out in accordance with DIN 53505 (Shore), 53504 (tensile strength, elongation at break) and DIN 53516 (abrasion). All S2 test bars (in accordance with DIN 53504) of the examples described were stored at 100° C. for 15 hours after production in the interests of better comparability.

TABLE 2

| Example | Shore hardness | Tensile strength/ MPa | Elongation at break/% | Abrasion/ mm³ |
|---|---|---|---|---|
| 13 | 67A | 37 | 920 | 54 |
| 14(C) | 69A | 48 | 810 | 48 |
| 15 | 63A | 35 | 950 | 57 |
| 16 | 57A | 32 | 970 | 58 |
| 17(C) | 62A | 42 | 910 | 61 |
| 18 | 64A | 33 | 750 | 59 |
| 19(C) | 65A | 32 | 720 | 62 |

It can be seen from the mechanical test data that the materials of the invention are usable TPU which in comparison with the commercial plasticizers represent a TPU having a good property profile.

The mechanical data for various TPU are compared in Examples 21 to 33 below. In the case of very soft materials having a hardness of less than 50 Shore A, there are no comparative data for conventional formulations because there have hitherto not been any materials of this type which can be processed in a conventional fashion and are also measurable. For comparison, TPU which were made by the process described in EP 1277773 B1, which is incorporated by reference to the present text. EP 1277773 B1 is incorporated by reference as a constituent part of the present text.

All materials according to the invention were produced in a one-shot process on a reaction extruder, and the pellets formed were processed by injection molding to give 2 mm thick test plates out of which S2 bars in accordance with DIN 53504 were stamped and the latter were subsequently subjected to mechanical tests.

Example 21

408 g of diphenylmethane 4,4'-diisocyanate, 51.02 g of 1,2-ethanediol and 1600 g of a polymer diol having a number average molar mass of 2000 g/mol derived from adipic acid and 1,2-ethanediol and 1,4-butanediol, the latter in a molar ratio of 1:1, are processed in a reaction extruder to synthesize a TPU. Furthermore, 12.8 g of a hydrolysis stabilizer (oligomeric carbodiimide derived from TMXDI), 6.25 g of an antioxidant (hindered phenol derived from tetramethylxylene and polyethylene glycol) and 4.16 g of lubricant (partially hydrolyzed montanic ester) are added thereto. The TPU pellets are molded by injection molding to give test bodies and subjected to mechanical tests. The maximum temperature of the melt in the production of the test bodies is 215° C.

Example 22

336 g of diphenylmethane 4,4'-diisocyanate, 49.35 g of 1,2-ethanediol and 1600 g of a polymer diol having a number average molar mass of 3000 g/mol derived from adipic acid and 1,3-methylpropanediol and 1,4-butanediol, the latter in a mass ratio of 1:1, are processed in a reaction extruder to synthesize a TPU. Furthermore, 12.8 g of a hydrolysis stabilizer (oligomeric carbodiimide derived from TMXDI), 6.02 g of an antioxidant (hindered phenol derived from tetramethylxylene and polyethylene glycol) and 4.02 g of lubricant (partially hydrolyzed montanic ester) are added thereto. The TPU pellets are molded by injection molding to give test bodies and subjected to mechanical tests. The maximum temperature of the melt in the production of the test bodies is 215° C.

Example 23

550.2 g of diphenylmethane 4,4'-diisocyanate, 49.6 g of 1,2-ethanediol and 1400 g of a polymer diol having a number average molar mass of 1000 g/mol derived from adipic acid and 1,4-butanediol are processed in a reaction extruder to synthesize a TPU. Furthermore, 11.2 g of a hydrolysis stabilizer (oligomericl carbodiimide derived from TMXDI), 6.06 g of an antioxidant (hindered phenol derived from tetramethylxylene and polyethylene glycol) and 4.04 g of lubricant (partially hydrolyzed montanic ester) are added thereto. The TPU pellets are molded by injection molding to give test bodies and subjected to mechanical tests. The maximum temperature of the melt in the production of the test bodies is 215° C.

Example 24

408 g of diphenylmethane 4,4'-diisocyanate, 51.02 g of 1,2-ethanediol and 1600 g of a polymer diol having a number average molar mass of 2000 g/mol derived from adipic acid and 1,6-hexanediol and 1,4-butanediol, the latter in a molar ratio of 1:1, are processed in a reaction extruder to synthesize a TPU. Furthermore, 12.8 g of a hydrolysis stabilizer (oligomericl carbodiimide derived from TMXDI), 6.25 g of an antioxidant (hindered phenol derived from tetramethylxylene and polyethylene glycol) and 4.16 g of lubricant (partially hydrolyzed montanic ester) are added thereto. The TPU pellets are molded by injection molding to give test bodies and subjected to mechanical tests. The maximum temperature of the melt in the production of the test bodies is 215° C.

Example 25

368 g of diphenylmethane 4,4'-diisocyanate, 49.94 g of 1,2-ethanediol and 1600 g of a polymer diol having a number average molar mass of 2500 g/mol derived from adipic acid and 1,4-butanediol are processed in a reaction extruder to synthesize a TPU. Furthermore, 12.8 g of a hydrolysis stabilizer (oligomericl carbodiimide derived from TMXDI), 6.12 g of an antioxidant (hindered phenol derived from tetramethylxylene and polyethylene glycol) and 4.08 g of lubricant (partially hydrolyzed montanic ester) are added thereto. The TPU pellets are molded by injection molding to give test bodies and subjected to mechanical tests. The maximum temperature of the melt in the production of the test bodies is 215° C.

Example 26

370 g of diphenylmethane 4,4'-diisocyanate, 50.63 g of 1,2-ethanediol and 1600 g of a polymer diol having a number average molar mass of 2200 g/mol derived from adipic acid and 1,2-ethanediol are processed in a reaction extruder to synthesize a TPU. Furthermore, 12.8 g of a hydrolysis stabilizer (oligomericl carbodiimide derived from TMXDI), 6.12 g of an antioxidant (hindered phenol derived from tetramethylxylene and polyethylene glycol) and 4.14 g of lubricant (partially hydrolyzed montanic ester) are added thereto. The TPU pellets are molded by injection molding to give test bodies and subjected to mechanical tests. The maximum temperature of the melt in the production of the test bodies is 205° C.

Comparative Example 27

A commercial polyester TPU as described in EP 1277773 B1, where a TPU was produced in a two-stage polymerization process (data sheet Elastollan C 60 A 10 HPM).

Comparative Example 28

Details from EP 1338614 B1, where a TPU was produced in a two-stage prepolymer process. EP 1338614 B1 is incorporated by reference as a constituent part of the present text.

TABLE 3

The mechanical tests are carried out in accordance with DIN 53505 (Shore), 53504 (tensile strength, elongation) and DIN 53516 (abrasion). The test specimens were stored at 100° C. for 15 hours after production in the interests of better comparability.

| Example | Shore hardness | Tensile strength/ MPa | Elongation at break/% | Abrasion/ mm³ |
|---|---|---|---|---|
| E 21 | 61 A | 38 | 740 | 35 |
| E 22 | 57 A | 30 | 730 | 65 |

TABLE 3-continued

The mechanical tests are carried out in accordance with DIN 53505 (Shore), 53504 (tensile strength, elongation) and DIN 53516 (abrasion). The test specimens were stored at 100° C. for 15 hours after production in the interests of better comparability.

| Example | Shore hardness | Tensile strength/ MPa | Elongation at break/% | Abrasion/ mm³ |
|---|---|---|---|---|
| E 23 | 61 A | 47 | 520 | 38 |
| E 24 | 59 A | 45 | 650 | 38 |
| E 25 | 88 A | 60 | 660 | 41 |
| E 26 | 60 A | 50 | 730 | 49 |
| C 27 | 60 A | 22 | 1100 | 70 |
| C 28 | 60 A | 13 | 880 | no figure |

Comparative examples using other aliphatic diols as chain extenders are not shown because they could not be processed by injection molding to give usable test bodies because of poor crystallization.

It can be seen from the mechanical test data that the materials according to the invention are high-quality TPU which display a very good mechanical property profile despite the low hardness.

Example 25 relating to a TPU having butanediol adipate having a high molar mass as soft phase, which tends to undergo soft-phase crystallization, is conspicuous in the table. Substantial after-hardening of the product therefore occurs at use temperature. For soft products, polymer diols which do not tend to crystallize should be selected.

The following examples (28 to 33) demonstrate that a suitable formulation using 1,2-ethanediol as chain extender and a plasticizer makes it possible to produce very soft TPU with still very good technical quality.

Example 28

370 g of diphenylmethane 4,4'-diisocyanate, 57.72 g of 1,2-ethanediol and 1000 g of a polymer diol having a number average molar mass of 2000 g/mol derived from adipic acid and 1,2-ethanediol and 1,4-butanediol, the latter in a molar ratio of 1:1, are processed in a reaction extruder to synthesize a TPU. Furthermore, 10 g of a hydrolysis stabilizer (oligomericl carbodiimide derived from TMXDI), 3.4 g of an antioxidant (hindered phenol derived from tetramethylxylene and polyethylene glycol), 3.4 g of lubricant (partially hydrolyzed montanic ester) and 254.91 g of the plasticizer (15% by weight) tributyl 2-acetoxy-1,2,3-propanetricarboxylate are added thereto. The TPU pellets are molded by injection molding to give test bodies and subjected to mechanical tests. The maximum temperature of the melt in the production of the test bodies is 215° C.

Comparative Example 29

350 g of diphenylmethane 4,4'-diisocyanate, 76.74 g of 1,4-butanediol and 1000 g of a polymer diol having a number average molar mass of 2000 g/mol derived from adipic acid and 1,2-ethanediol and 1,4-butanediol, the latter in a mass ratio of 1:1, are processed in a reaction extruder to synthesize a TPU. Furthermore, 10 g of a hydrolysis stabilizer (oligomericl carbodiimide derived from TMXDI), 3.4 g of an antioxidant (hindered phenol derived from tetramethylxylene and polyethylene glycol), 3.4 g of lubricant (partially hydrolyzed montanic ester) and 254.74 g of the plasticizer (15% by weight) tributyl 2-acetoxy-1,2,3-propanetricarboxylate are added thereto. The TPU pellets are molded by injection molding to give test bodies and subjected to mechanical tests. The maximum temperature of the melt in the production of the test bodies is 215° C.

Example 30

260 g of diphenylmethane 4,4'-diisocyanate, 32.33 g of 1,2-ethanediol and 1000 g of a polymer diol having a number average molar mass of 2000 g/mol derived from adipic acid and 1,2-ethanediol and 1,4-butanediol, the latter in a mass ratio of 1:1, are processed in a reaction extruder to synthesize a TPU. Furthermore, 10 g of a hydrolysis stabilizer (oligomericl carbodiimide derived from TMXDI), 3.08 g of an antioxidant (hindered phenol derived from tetramethylxylene and polyethylene glycol), 3.08 g of a lubricant (partially hydrolyzed montanic ester) and 230.89 g of the plasticizer (15% by weight) tributyl 2-acetoxy-1,2,3-propanetricarboxylate are added thereto. The TPU pellets are molded by injection molding to give test bodies and subjected to mechanical tests. The maximum temperature of the melt in the production of the test bodies is 215° C.

Example 31

260 g of diphenylmethane 4,4'-diisocyanate, 33.87 g of 1,2-ethanediol and 1000 g of a polymer diol having a number average molar mass of 2000 g/mol derived from adipic acid and 1,2-ethanediol and 1,4-butanediol, the latter in a mass ratio of 1:1, are processed in a reaction extruder to synthesize a TPU. Furthermore, 10 g of a hydrolysis stabilizer (oligomericl carbodiimide derived from TMXDI), 3.08 g of an antioxidant (hindered phenol derived from tetramethylxylene and polyethylene glycol), 3.08 g of lubricant (partially hydrolyzed montanic ester) and 230.89 g of the plasticizer (15% by weight) tributyl 2-acetoxy-1,2,3-propanetricarboxylate are added thereto. The TPU pellets are molded by injection molding to give test bodies and subjected to mechanical tests. The maximum temperature of the melt in the production of the test bodies is 215° C.

Example 32

260 g of diphenylmethane 4,4'-diisocyanate, 34.23 g of 1,2-ethanediol and 1000 g of a polymer diol having a number average molar mass of 2000 g/mol derived from adipic acid and 1,2-ethanediol and 1,4-butanediol, the latter in a mass ratio of 1:1, are processed in a reaction extruder to synthesize a TPU. Furthermore, 10 g of a hydrolysis stabilizer (oligomericl carbodiimide derived from TMXDI), 3.09 g of an antioxidant (tetrakis[methylene(3,5-di-tert-butyl-4-hydroxyhydrocinnamate)]methane), 4.63 g of lubricant (partially hydrolyzed montanic ester) and 231.52 g of the plasticizer (15% by weight) dipropylene glycol dibenzoate are added thereto. The TPU pellets are molded by injection molding to give test bodies and subjected to mechanical tests. The maximum temperature of the melt in the production of the test bodies is 215° C.

Comparative Example 33

325 g of diphenylmethane 4,4'-diisocyanate, 73.83 g of 1,4-butanediol and 1000 g of a polymer diol having a number average molar mass of 2000 g/mol derived from adipic acid and 1,2-ethanediol and 1,4-butanediol, the latter in a mass ratio of 1:1, are processed in a reaction extruder to synthesize a TPU. Furthermore, 10 g of a hydrolysis stabilizer (oligomericl carbodiimide derived from TMXDI), 3.78 g of an antioxidant (tetrakis[methylene(3,5-di-tert-butyl-4-hydroxyhydrocinnamate), 5.67 g of lubricant (partially hydrolyzed montanic ester) and 472.76 g of the plasticizer (25% by weight) dipropylene glycol dibenzoate are added thereto. The TPU pellets are molded by injection molding to give test bodies and subjected to mechanical tests. The maximum temperature of the melt in the production of the test bodies is 215° C.

TABLE 4

The mechanical tests are carried out in accordance with DIN 53505 (Shore), 53504 (tensile strength, elongation) and DIN 53516 (abrasion). The test specimens were stored at 100° C. for 15 hours after production in the interests of better comparability.

| Example | Shore hardness | Tensile strength/ MPa | Elongation at break/% | Abrasion/ $mm^3$ |
|---------|----------------|----------------------|----------------------|---------|
| E 28 | 66 A | 39 | 790 | 31 |
| C 29 | 66 A | 40 | 800 | 31 |
| E 30 | 51 A | 35 | 810 | 29 |
| E 31 | 35 A | 11 | 1110 | 185 |
| E 32 | 38 A | 9 | 1160 | 253 |
| C 33 | 45 A | 5 | 1210 | 320 |

It can be seen from the values in Table 4 that very soft TPU comprising plasticizer can be obtained in an appropriate way using raw materials customary for TPU in the one-shot process only by means of the formulation according to the invention. TPU which have Shore hardnesses below 40 A and can be processed by injection molding to give industrial articles are not known in the literature, so that comparative examples cannot be presented.

The invention claimed is:

1. A thermoplastic polyurethane composition, comprising:
    A) 50-99% by weight of a thermoplastic polyurethane comprising, in reacted form,
        1) at least one organic diisocyanate (a),
        2) at least one compound (b) which is reactive toward an isocyanate and has a molecular weight of from 0.5 kg/mol to 8 kg/mol,
        3) a chain extender (c) comprising 1,2-ethylenediol, wherein the 1,2-ethylene diol is employed in an amount of from 2.5% to 3.5% by weight based on the total weight of (a), (b), and (c), and
    B) 1-50% by weight of the tributy1-2-acetoxy-1,2,3-propanetricarboxylate, wherein:
    the composition has a Shore A hardness, measured in accordance with DIN 53505, of less than 60; and
    the composition is produced by a one-shot process.

2. The composition of claim 1, wherein at least 90% by weight of the organic diisocyanate (a) is diphenylmethane diisocyanate (MDI).

3. The composition of claim 1, wherein the at least one compound (b) is a polyol (b1).

4. The composition of claim 3, wherein the polyol (b1) is a polymer based on at least one selected from the group consisting of adipic acid, butanediol, and ethylene glycol, and the number average molecular weight is in a range of from 0.8 kg/mol to 2.5 kg/mol.

5. The composition of claim 3, wherein the polyol (b1) is a polymer based on adipic acid, butanediol, and hexanediol, and the number average molecular weight of the polyol (b1) is in a range of from 0.8 kg/mol to 2.5 kg/mol.

6. The composition of claim 1, wherein the 1,2-ethylene diol is employed in an amount of from 2.5% by weight to 3% by weight based on the total weight of (a), (b), and (c).

7. The composition of claim 1, wherein the composition has a Shore A hardness, measured in accordance with DIN 53505, of less than 50.

8. The composition of claim 1, wherein the composition has a Shore A hardness, measured in accordance with DIN 53505, of less than 40.

9. A process for producing a thermoplastic polyurethane composition, comprising:
   A) 50-99% by weight of a thermoplastic polyurethane comprising, in reacted form,
      1) at least one organic diisocyanate (a),
      2) at least one compound (b) which is reactive toward an isocyanate and has a molecular weight of from 0.5 kg/mol to 8 kg/mol,
      3) a chain extender (c) comprising 1,2-ethylenediol, wherein the 1,2-ethylene diol is employed in an amount of from 2.5% to 3.5% by weight based on the total weight of (a), (b), and (c), and
   B) 1-50% by weight of the tributyl-2-acetoxy-1,2,3-propanetricarboxylate, the process comprising:
      combining at least components A1), A2), A3), and B) in a one-shot process.

10. A product, comprising:
    the thermoplastic polyurethane composition of claim 1.

11. The composition of claim 1, wherein the thermoplastic polyurethane comprises at least one selected from the group consisting of a catalyst (d), a customary auxiliary (e), and an additive (f).

12. The composition of claim 2, wherein the at least one compound (b) is a polyol (b1).

13. The process of claim 9, further comprising:
    simultaneously combining at least one selected from the group consisting of a catalyst, a customary auxiliary, and an additive.

14. The composition of claim 1, wherein the Shore A hardness is measured using a test piece stored at a temperature of 100° C. for 15 hours after production.

* * * * *